United States Patent
Shivanna et al.

(10) Patent No.: US 11,308,092 B2
(45) Date of Patent: Apr. 19, 2022

(54) STREAM PROCESSING DIAGNOSTICS

(71) Applicant: Microsoft Technology Licensing, LLC, Redmond, WA (US)

(72) Inventors: Abhishek Shivanna, San Jose, CA (US); Kartik Paramasivam, Sunnyvale, CA (US); Ray Manpreet Singh Matharu, Sunnyvale, CA (US); Samarth Shetty, Campbell, CA (US); Srinivasulu Punuru, San Carlos, CA (US); Yi Pan, San Jose, CA (US); Prateek Maheshwari, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 16/437,217

(22) Filed: Jun. 11, 2019

(65) Prior Publication Data
US 2020/0394196 A1 Dec. 17, 2020

(51) Int. Cl.
*G06F 16/2455* (2019.01)
*G06F 16/22* (2019.01)
*G06F 16/23* (2019.01)
*G06F 16/215* (2019.01)

(52) U.S. Cl.
CPC ...... *G06F 16/24568* (2019.01); *G06F 16/215* (2019.01); *G06F 16/2264* (2019.01); *G06F 16/2322* (2019.01)

(58) Field of Classification Search
CPC ........... G06F 16/24568; G06F 16/2264; G06F 16/2322; G06F 16/215
See application file for complete search history.

(56) References Cited

U.S. PATENT DOCUMENTS

| | | | | |
|---|---|---|---|---|
| 2010/0046393 A1* | 2/2010 | Knapp | ................ | H04L 41/0609 370/253 |
| 2011/0029484 A1* | 2/2011 | Park | ................... | G06F 16/217 707/634 |
| 2013/0272318 A1* | 10/2013 | Swinkels | ............... | H04L 12/56 370/468 |
| 2014/0067772 A1* | 3/2014 | Sabbouh | ............... | G06F 16/22 707/690 |
| 2016/0147812 A1* | 5/2016 | Andrei | ............... | G06F 16/2322 707/703 |
| 2019/0146763 A1* | 5/2019 | Gould | ................ | G06F 11/3476 717/144 |
| 2019/0222419 A1* | 7/2019 | Adams | ............... | G06F 21/6209 |
| 2020/0104110 A1* | 4/2020 | Singh | .................. | G06F 11/079 |
| 2020/0295879 A1* | 9/2020 | Jas | ...................... | G06F 16/2358 |

* cited by examiner

*Primary Examiner* — William B Partridge
*Assistant Examiner* — Aryan D Toughiry
(74) *Attorney, Agent, or Firm* — Nicholson De Vos Webster & Elliott LLP (57) ABSTRACT

The disclosed embodiments provide a system for processing data. During operation, the system receives records of activity within a stream-processing system over a set of event streams, wherein each event stream in the set of event streams contains events related to a corresponding job in the stream-processing system. Next, the system indexes data in the records under a set of keys that include a first key related to jobs in the stream-processing system and a second key related to errors in the stream-processing system. The system then outputs the indexed data for use in analyzing the execution of the stream-processing system.

20 Claims, 5 Drawing Sheets

STREAM PROCESSING DIAGNOSTICS

BACKGROUND

Field

The disclosed embodiments relate to stream-processing systems. More specifically, the disclosed embodiments relate to techniques for providing stream processing diagnostics.

Related Art

Analytics allows trends, patterns, relationships, and/or other attributes related to large sets of complex, interconnected, and/or multidimensional data to be discovered. In turn, the discovered information can be used to gain insights and/or guide decisions and/or actions related to the data. For example, business analytics may be used to assess past performance, guide business planning, and/or identify actions that may improve future performance.

However, significant increases in the size of data sets have resulted in difficulties associated with collecting, storing, managing, transferring, sharing, analyzing, and/or visualizing the data in a timely manner For example, conventional software tools and/or storage mechanisms are unable to handle petabytes or exabytes of loosely structured data that is generated on a daily and/or continuous basis from multiple, heterogeneous sources.

Instead, management and processing of "big data" commonly require massively parallel and/or distributed software running on a large number of physical servers. For example, multiple applications, services, nodes, and/or other collections of hardware or software components are distributed across an organization's infrastructure. As events occur within or across the infrastructure, the components generate event streams that track and/or record the events in near-real-time. Such events include, but are not limited to, user activity data, messaging data, telemetry data, video streams, audio streams, networking data, performance data, notification data, diagnostics data, and/or analytics data. A stream-processing system then partitions, aggregates, filters, transforms, windows, and/or joins data in the streams before outputting the results of such processing in new streams in a continuous and/or near-real-time basis.

On the other hand, the distributed nature of stream-processing systems complicates the detection, diagnosis, and/or resolution of errors, issues, or failures. For example, a failure in a host within a stream-processing system is detected by a monitoring system, which alerts administrators to the failure by outputting an error related to the failure. However, conventional monitoring systems typically characterize errors using exceptions and other software-related issues and lack information related to hosts or components experiencing the errors in the stream-processing system. As a result, the administrators are required to manually diagnose the root causes of the errors, which can be time-consuming and exacerbate latency or downtime in the stream-processing system.

Second, stateful stream processing involves maintaining a state that tracks data and/or operations related to multiple events and/or streams. For example, a node in a stream-processing system aggregates click events from an input stream into a count of the number of clicks for each user over an hour. During the aggregation, the node maintains a state that includes counters, which are incremented in response to click events for the corresponding users. When the node experiences a failure, the state is lost and can be restored by "replaying" the node's processing of the same input stream and/or copying the state from a replica of the node in another cluster or data center. In both instances, recovering the node's state incurs significant overhead that extends the downtime of the node. While the node is down, downstream applications or services are unable to use of the node's output, which can further disrupt the operation or availability of the downstream applications or services.

Consequently, big data analytics may be facilitated by mechanisms for efficiently and/or effectively monitoring and managing errors and failures in distributed data-processing systems.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for managing a stream-processing system. In these embodiments, the stream-processing system includes multiple distributed nodes that apply filters, transformations, aggregations, joins, windowing, and/or other types of operations to streaming data. For example, the stream-processing system includes an Apache Samza platform that is deployed across a number of hosts, clusters, and/or data centers. Each Samza stream processor in the platform consumes one or more input streams, which can include event streams from a distributed streaming platform such as Apache Kafka (Kafka™ is a registered trademark of the Apache Software Foundation), changes to a database or other data store transmitted over a change data capture (CDC) pipeline, and/or a number of input files in a distributed filesystem. Each stream processor produces one or more output streams from the corresponding input streams, which can further be inputted into additional stream processors for subsequent and/or chained processing of streaming data.

More specifically, the disclosed embodiments provide a method, apparatus, and system for providing diagnostics for a stream-processing system. The functionality of the stream-processing system is implemented using a number of jobs, with each job applying one or more transformations or operations to one or more inputs streams to generate one or more output streams. Each job is additionally divided into containers, tasks, stream processors, instances, and/or other units of work or parallelism.

To enable diagnostics for the stream-processing system, containers, tasks, stream processors, and/or other subcomponents of each job in the stream-processing system periodically emit records of activity on the subcomponents to a diagnostics event stream for the job. Data in the records includes, but is not limited to, errors, incarnations of containers, attempts at deploying instances, input stream offsets processed by the subcomponents, and/or other information related to the execution and performance of the job.

A diagnostics system organizes or indexes data in the records under keys associated with the jobs, errors, containers, and/or other categories. For example, the diagnostics system includes one or more additional Samza stream processors. Each stream processor generates a key from one or more fields in a record received over a diagnostics event stream and maps the key to additional fields in the record and/or other records with the same key. The stream processor stores such key-value pairs in an in-memory state or on a local disk and periodically writes the state to an output stream, database, and/or other data store.

Data in the data store can then be outputted in a report, user interface, and/or tool to allow administrators of the stream-processing system to assess the performance or operation of components of the stream-processing system and/or perform root cause analysis of errors in the components. For example, the outputted data includes names, identifiers (IDs), inputs, outputs, incarnations, attempts, and/or other attributes related to jobs, instances, containers, tasks, and/or other components of the stream-processing system. The outputted data additionally includes names, types, locations, timestamps, and/or other attributes related to errors occurring in the components. In turn, the administrators are able to use sequences of events and/or errors within the same component or across components to analyze the causes of the errors and/or identify solutions to the errors. The administrators can also, or instead, use the outputted data to compute statistics on error rates, failure rates, and/or mean times to failure (MTTFs).

Data in the data store can also be used by an automated controller to take remedial actions based on the errors. For example, the controller can remedy an "out of memory" error by assigning more memory resources to the component affected by the error.

The diagnostics system additionally tracks timestamps associated with updates to key-value pairs in the state and uses the timestamps to selectively write and/or delete a subset of the key-value pairs. Continuing with the above example, each stream processor tracks the earliest timestamp from event stream data associated with a given key value (i.e., the timestamp from the first record that produced the key value) and the latest timestamp from event stream data associated with the same key value (i.e., the timestamp from the last record that produced the key value). When the latest timestamp exceeds the time of the most recent write of data for the key value to the data store, the stream processor writes the state associated with the key value to the data store. When the current time exceeds the latest timestamp by more than a threshold, the stream processor removes the key value and corresponding data from the in-memory state.

Because records of activity in the stream-processing system are generated and received over per-job event streams, each event stream contains a chronological sequence of events or activity for a given job. As a result, the event streams allow administrators to track and/or correlate events or activity that lead up to or result in an error or failure associated with the job. Additional aggregation and/or indexing of data in the event streams by keys related to jobs, containers, errors, and/or other entities provides additional context related to the errors and allows events, activity, and/or errors to be correlated across different components of each job and/or the stream-processing system. The tracking of earliest and latest timestamps in the records further reduces processing, network usage, and/or overhead by allowing each write of in-memory state to the data store to be performed only for key-value pairs that have been updated since the previous write. Consequently, the disclosed embodiments provide technological improvements in applications, tools, computer systems, and/or environments for monitoring, executing, and/or managing stream-processing systems and/or diagnostics systems.

Stream Processing Diagnostics

Figure 1:
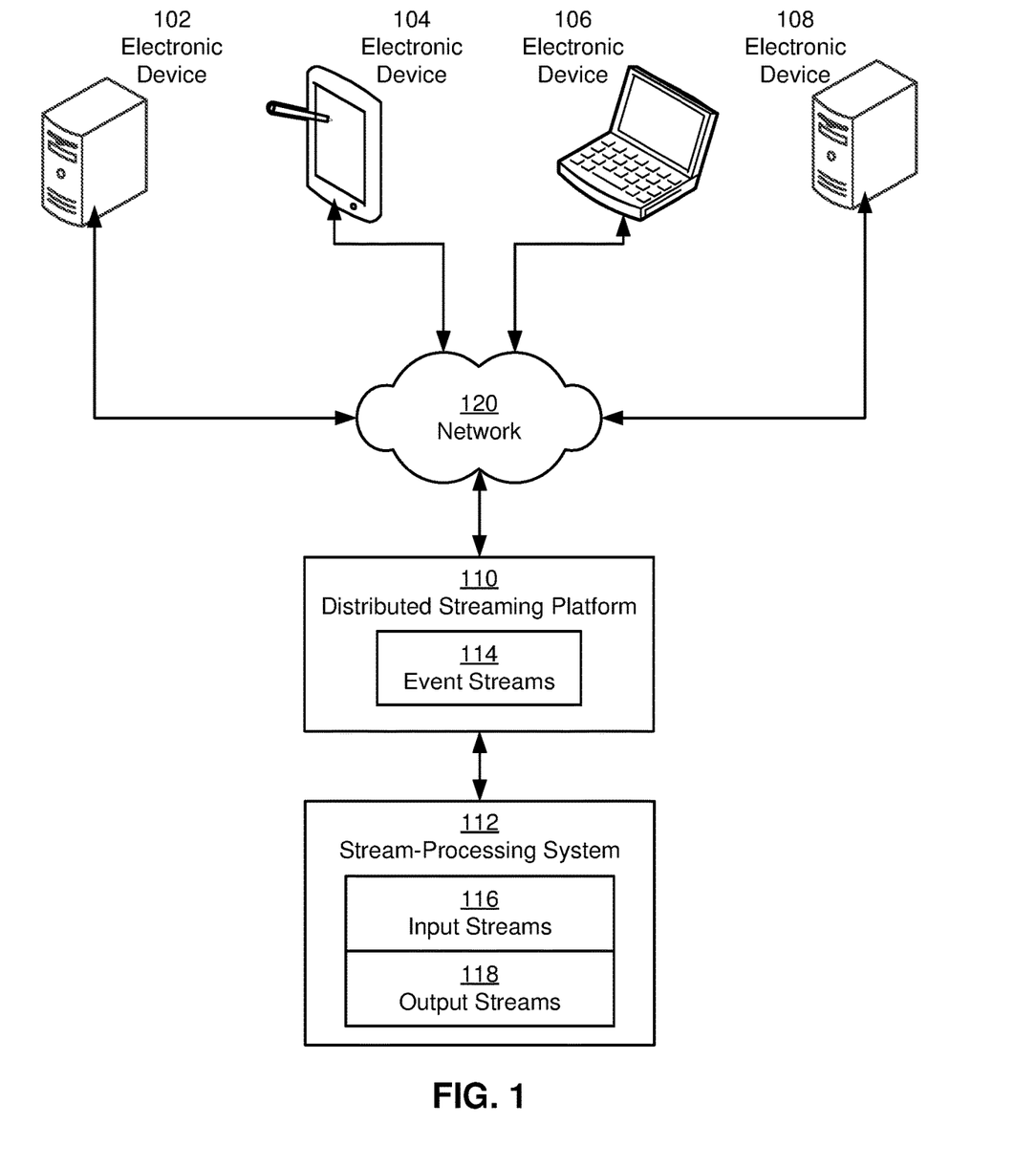
FIG. 1 shows a schematic of a system in accordance with the disclosed embodiments.

FIG. 1 shows a schematic of a system in accordance with the disclosed embodiments. As shown in FIG. 1, a number of event streams 114 are generated and/or transmitted over a distributed streaming platform 110 based on clicks, views, searches, purchases, sessions, application invocations, and/or other activity on a set of electronic devices 102-108 connected to a network 120. Electronic devices 102-108 include, but are not limited to, personal computers (PCs), laptop computers, tablet computers, mobile phones, portable media players, workstations, servers, gaming consoles, and/or other network-enabled computing devices. Network 120 includes, but is not limited to, a local area network (LAN), wide area network (WAN), personal area network (PAN), virtual private network, intranet, cellular network, Wi-Fi network (Wi-Fi® is a registered trademark of Wi-Fi Alliance), Bluetooth (Bluetooth® is a registered trademark of Bluetooth SIG, Inc.) network, universal serial bus (USB) network, Ethernet network, and/or switch fabric.

In one or more embodiments, distributed streaming platform 110 generates and/or maintains event streams 114 containing records of page views, clicks, searches, page loads, service calls, errors, anomalies, failures, and/or other activity collected from electronic devices 102-108. Records in event streams 114 also, or instead, include performance metrics related to the activity, such as page load times, download times, function execution times, connection times, latencies, click-through rates, and/or conversion rates. Records in event streams 114 also, or instead, include dimensions associated with the activities and/or metrics, such as entity IDs, page keys, locations, browser names and/or versions, operating systems, device types, network connection types, protocols, environments, and/or time intervals. Thus, with large numbers of electronic devices 102-108 in a highly distributed system, distributed streaming platform 110 can receive large volumes of records from event streams 114 on a real-time or near-real-time basis.

For example, distributed streaming platform 110 includes an Apache Kafka (Kafka™ is a registered trademark of the Apache Software Foundation) platform that is deployed across a number of hosts, clusters, data centers, and/or other collections of computing resources. When a certain type of activity (e.g., click, request, user session, download, etc.) occurs on an electronic device (e.g., electronic devices 102-108), a publisher in distributed streaming platform 110 generates a record of the activity and publishes the record to one or more event streams 114. Distributed streaming platform 110 then propagates the record to components subscribing to the same event streams(s), such as a stream-processing system 112. Consequently, distributed streaming platform 110 allows activity occurring on multiple nodes of a distributed system (e.g., electronic devices 102-108) to be captured and transmitted in a unified, scalable manner.

In one or more embodiments, stream-processing system 112 includes multiple distributed nodes that apply filters, transformations, aggregations, joins, windowing, and/or other operations to event streams 114 obtained from distributed streaming platform 110 and/or other sources. For example, stream-processing system 112 includes an Apache Samza platform that is deployed across a number of hosts, clusters, and/or data centers. Each stream processor in the Samza platform consumes one or more input streams 116, which can include Apache Kafka event streams 114, changes to a database or other data store transmitted over a change data capture (CDC) pipeline, and/or a number of input files in a distributed filesystem. Each stream processor also produces one or more output streams 118 from the corresponding input streams, which can further be inputted into additional stream processors for further processing of data in the output stream(s).

Figure 2:
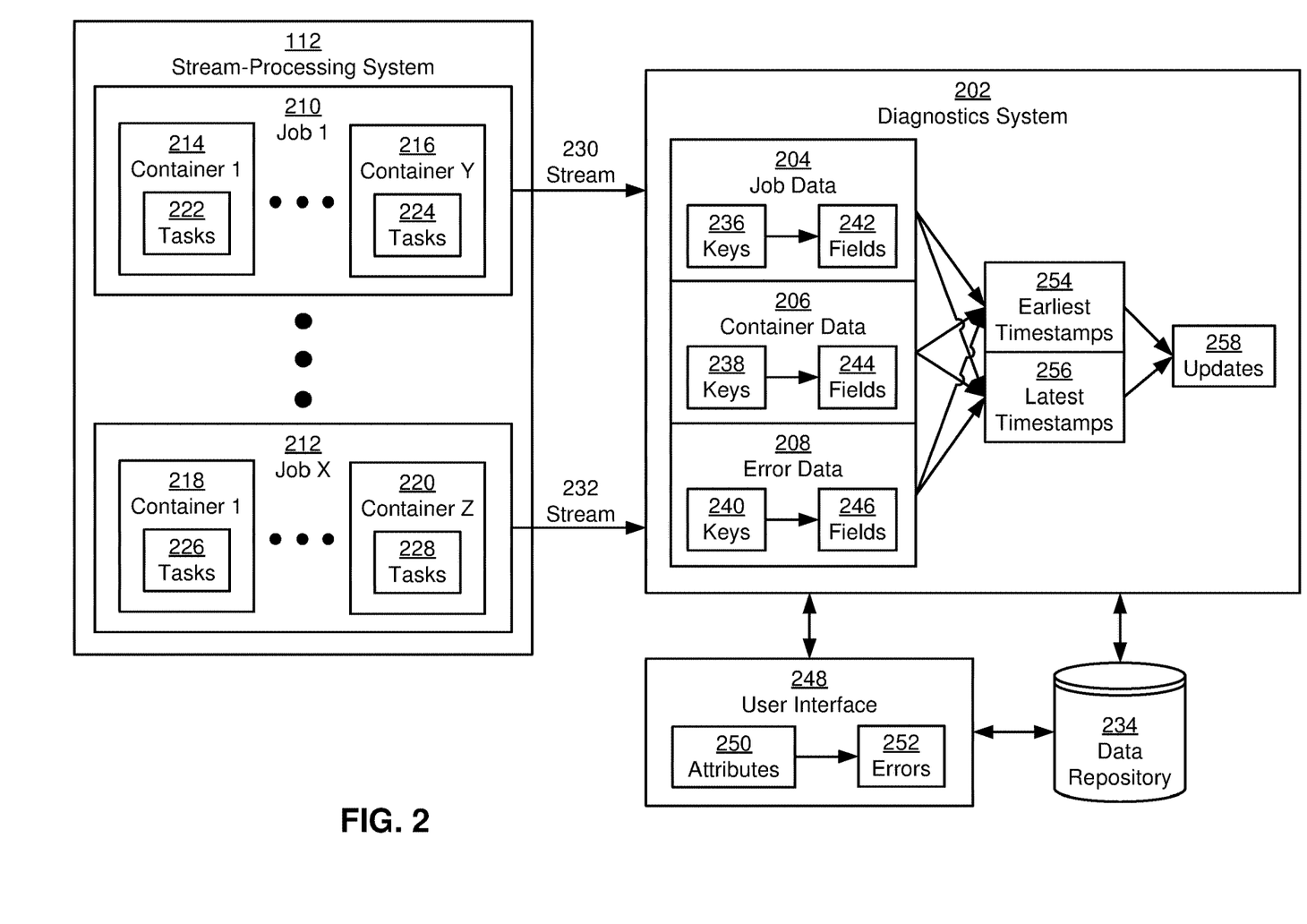
FIG. 2 shows a system for providing stream processing diagnostics in accordance with the disclosed embodiments.

In one or more embodiments, stream-processing system 112 includes functionality to generate, aggregate, and/or organize diagnostics data that can be used to analyze the performance or execution of stream-processing system 112 and/or perform root cause analysis of errors in stream-processing system 112. As shown in FIG. 2, stream-processing system 112 includes a number of jobs (e.g., job 1 210, job x 212) that carry out the functionality of stream-processing system 112. For example, each job includes a Samza job that applies one or more stream-processing operations or transformations to a number of input streams to generate a number of output streams.

Within stream-processing system 112, each job is divided into a number of containers. In particular, job 1 210 includes container 1 214 to container y 216, and job x 212 includes container 1 218 to container z 220. Each container is further divided into one or more tasks (e.g., tasks 222-228) that carry out stream-processing operations for the corresponding job. Continuing with the above example, each Samza job includes a number of Samza containers that are deployed on different sets of physical resources (e.g., processor, memory, storage, etc.) on nodes or hosts in a cluster. Each container runs one or more Samza tasks that process different partitions of the same input streams to produce output that is used to populate the same output streams.

In one or more embodiments, tasks, containers, jobs, and/or other components of stream-processing system 112 include functionality to emit structured diagnostic data over a number of diagnostic streams 230-232. For example, streams 230-232 include Kafka event streams that contain "beacons" of structured runtime information from the components. Each stream includes beacons from a corresponding job, container, task, and/or other component of stream-processing system 112. Data transmitted in the beacons includes, but is not limited to, information related to errors (e.g., errors 252) in the components; names, identifiers (IDs), incarnations, attempts, and/or other attributes related to the components; and/or the latest offsets in input streams processed by the components. Because each event stream contains a chronological sequence of events or activity for a given job (or sub-component of a job), data in the event stream allows administrators and/or other users to track and/or correlate the events or activity that lead up to or result in an error or failure associated with the job (or sub-component).

In another example, some or all beacons emitted by containers and/or other components in stream-processing system 112 include structured data with the following schema:

```
Header {
    jobName: String
    jobId: String
    containerName: String
    containerId: String
    sourceVersion: String
    hostname: String
    timestamp: Long
}
Body {
    exceptions: List of errorTimestamp, errorID,
        errorType, errorMessage, and compactedStackTrace.
    errorID: hash of errorType combined with hash
        of compactedStackTrace.
    inputoffsets: List of Map of Strings to Offsets
}
```

The example schema above includes a header and a body for each beacon. Fields in the header include a job name, job ID, container name, container ID, source version (e.g., the version of source code used to execute the component), hostname, and/or timestamp. As a result, the header includes attributes that identify components to which data in the body pertains, as well as the time at which the beacon was generated.

Fields in the body include "exceptions" that describe errors occurring in the job, container, host, and/or other component identified in the header. Each error is described using a list of attributes, which includes a timestamp of the error, an error ID, an error type (e.g., a Samza exception type), an error message (e.g., the message displayed with or after the Samza exception), and a compacted stack trace associated with the error. The error ID is generated as a hash of the error type combined (e.g., concatenated with) a hash of the compacted stack trace.

The body additionally includes a mapping of input stream names to the latest offsets processed by the components from the corresponding input streams at the time at which the beacon was generated. Such offset information allows the processing of the input streams by the corresponding components to be tracked over time and/or correlated with errors in the components.

A diagnostics system 202 receives beacons transmitted over streams 230-232 and processes the beacons by organizing or indexing data in the beacons as fields 242-246 that are mapped to various types of keys 236-238. For example, diagnostics system 202 includes one or more Samza jobs that merge beacons from multiple streams 230-232 into a single output stream. The Samza job(s) optionally filter out certain fields and/or types of beacons from streams 230-232 before merging the beacons into the output stream. Diagnostics system 202 also, or instead, includes one or more additional Samza jobs that process events from streams 230-232 and/or the merged output stream. During processing of the events, the additional Samza job(s) generate keys 236-240 from one or more fields in the events and map the keys to "blobs" of data that store additional fields 242-246 associated with the keys.

As shown in FIG. 2, diagnostics system 202 uses records in streams 230-232 to generate job data 204 that maps one set of keys 236 to corresponding fields 242, container data 206 that maps a second set of keys 238 to corresponding fields 244, and error data 208 that maps a third set of keys 240 to corresponding fields 246. Job data 204 includes keys 236 and fields 242 related to jobs in stream-processing system 112. In some embodiments, keys 236 include a "job key" that is generated as a combination and/or composite of a job name for a job, an instance ID for an instance of the job, and/or a number of attempts (e.g., redeployments, reincarnations, etc.) associated with the job. For example, a key in job data 204 includes a job name of "samzajob1," an instance ID of "i001," and an attempt number of 1, which indicates that the instance has been deployed or started one time.

In some embodiments, each key value in job data 204 is mapped to fields 242 that include a version of stream-processing system 112 (e.g., a Samza version), the job's version, an owner of the job, a metric and/or rating of the job's health, one or more inputs to the job, one or more outputs of the job, an access control list (ACL) group for the job, and/or other job attributes related to the job. Fields 242 also, or instead, include mappings of container names for containers into which the job is divided to the number of incarnations of the corresponding containers (e.g., the number of times a container has switched hosts or restarted) and container IDs of the container incarnations.

Container data 206 includes keys 238 and fields 244 related to containers for jobs in stream-processing system 112. In some embodiments, container data 206 includes two types of keys 238. The first type of key is generated as a combination and/or composite of the job key described above, a container name of a container for a job, and an incarnation number that identifies the ordinal position of an incarnation of the container in a series of incarnations for the container. The key is mapped to one or more fields 244 that include, but are not limited to, a unique container ID of the incarnation (e.g., a Yet Another Resource Negotiator (YARN) container ID for the incarnation). As a result, mappings associated with the first type of key allow a non-enumerable container ID for a given container incarnation (e.g., "container_e109_1524277282189_1376_01_000001") to be matched to human-readable attributes related to the corresponding job, instance, number of attempts associated with the instance, container, and/or the ordinal incarnation number for the incarnation.

The second type of key includes the container ID of a given container incarnation. The key is mapped to fields 244 that include, but are not limited to, a host name of the host on which the container incarnation is deployed, a metric and/or rating of the container's health, information related to a virtual machine associated with the container, and/or metrics related to execution of the container (e.g., garbage collection time, flush time, etc.). Fields 244 also, or instead include mappings of names or IDs of tasks in the container to input streams of the tasks, output streams of the tasks, checkpoints associated with the tasks' states, timestamps of the checkpoints, errors associated with the tasks, and/or other data related to the tasks.

Error data 208 includes keys 240 and fields 246 related to errors in stream-processing system 112. In some embodiments, error data 208 includes two types of keys 240. The first type of key is generated as a unique "error ID" for an error. As described above, the error ID is generated as a combination or composite of the hash of the error type of the error and the hash of the compacted stack trace for the error. The error ID is mapped to one or more fields 246 that include, but are not limited to, the timestamp of the error, the error type, an error message for the error, a cause type and/or message related to a cause of the error, and/or a compacted stack trace for the error. Because the first type of key is generated from the error ID and error type of a given error, diagnostics system 202 generates a single entry in error data 208 for the error, independently of the number of occurrences of the error across jobs, instances, containers, container incarnations, and/or other components of stream-processing system 112. In turn, diagnostics system 202 prevents redundant storage of error information for the same error in error data 208.

The second type of key is generated as a combination and/or composite of the job key described above, a container ID for an incarnation of a container for the corresponding job, a scope of an error (e.g., a partition, table name, environment, and/or other location or context associated with the error), and the error ID of the error. The key is mapped to one or more fields 246 that include an ordered list of timestamps representing times at which an error represented by the error ID and scope have occurred at the corresponding container incarnation and job. As a result, error data 208 that includes the second type of key track occurrences of errors in various components of stream-processing system 112.

In some embodiments, diagnostics system 202 applies a set of rules to some fields in error data 208 to populate other fields in error data 208. More specifically, diagnostics system 202 classifies errors in error data 208 based on exception types, exception messages, and/or stack traces of the errors. An example rule based on exception type includes setting the scope, cause, and/or other attributes of an error to an unrecoverable or fatal exception for the entirety of stream-processing system 112 and/or an application in which the error occurs when the exception type includes a "NullPointerException" or a "ClassNotFoundException."

An example rule based on exception type and exception message includes categorizing an error with an exception type of "KafkaTopicAuthorizationException" or "MySQLException" as a non-fatal exception. The rule also sets a scope of the error based on details in the corresponding exception message (e.g., setting the scope to a Kafka topic name associated with a KafkaTopicAuthorizationException or a table name and/or operation (read/write) associated with a MySQLException).

An example rule based on exception type, exception message, and stack trace includes categorizing an exception of a certain type (e.g., NullPointerException) as fatal when the exception occurs on a main thread. If the exception occurs on a side thread, the error is categorized as non-fatal, and the scope of the error is set to functionality associated with the corresponding side thread (e.g., based on the name of the thread or thread factory).

Diagnostics system 202 additionally tracks earliest timestamps 254 and latest timestamps 256 associated with some or all keys 236-240 in job data 204, container data 206, and/or error data 208. For example, diagnostics system 202 includes an earliest timestamp, a latest timestamp, and a latest update time in the fields (e.g., fields 242-246) mapped to some or all types of keys (e.g., 236-240) in job data 204, container data 206, and/or error data 208. When a new key value is generated from a record received over streams 230-232, diagnostics system 202 maps the new key value to a corresponding set of fields and stores, in the fields, an earliest timestamp and a latest timestamp that are both set to the timestamp of the record. For each subsequent record received over streams 230-232 that produces the same key value, diagnostics system 202 updates the fields with data in the subsequent record and updates the latest timestamp in the fields to the timestamp of the subsequent record. Diagnostics system 202 optionally tracks the last time at which the fields were updated using an "update timestamp" in the fields. Consequently, the earliest timestamp and latest timestamp associated with a given key in job data 204, container data 206, and/or error data 208 capture the range of time spanned by other fields to which the key is mapped.

In one or more embodiments, diagnostics system 202 periodically and/or continually outputs updates 258 to keys 236-240 and/or fields 242-246 to a data repository 234 and/or a user interface 248. For example, diagnostics system 202 includes one or more Samza jobs that store mappings of keys 236-240 to fields 242-246 in a local Samza state and/or on a local disk. The Samza jobs periodically persist updates 258 to key-value pairs in job data 204, container data 206, and/or error data 208 to a relational database, key-value store, and/or another data store providing data repository 234.

In one or more embodiments, diagnostics system 202 uses earliest timestamps 254 and/or latest timestamps 256 in job data 204, container data 206, and/or error data 208 to perform selective writing of updates 258 and/or deleting of the key-value pairs in in-memory state and/or data repository 234. For example, each stream processor in diagnostics system 202 periodically writes, to data repository 234, updates 258 that have been made to in-memory state containing job data 204, container data 206, and/or error data 208 since the previous write of job data 204, container data 206, and/or error data 208 to data repository 234. To identify updates 258, the stream processor compares the latest timestamp associated with a given key-value pair in the state to the time of the most recent write to data repository 234. If the latest timestamp is greater than the time of the most recent write, the stream processor includes the key-value pair in updates 258 and subsequently writes updates 258 to data repository 234.

In another example, diagnostics system 202 ensures that updates to job data 204, container data 206, and/or error data 208 in in-memory state are idempotent by comparing the latest timestamp mapped to a key to the timestamp of a record received over streams 230-232 that produces the same key. Diagnostics system 202 updates the fields mapped to the key with data in the record only when the timestamp in the record is later than the latest timestamp.

In a third example, each stream processor in diagnostics system 202 compares the earliest or latest timestamp mapped to a key to the current time. If the current time exceeds the earliest or latest timestamp by more than a threshold, the stream processor removes the key and fields mapped to the key from its in-memory state.

In a fourth example, a tool and/or process periodically scans data repository 234 and compares earliest timestamps 254 and/or latest timestamps 256 of entries in data repository 234 with the current time. If the current time exceeds an earliest or latest timestamp in an entry by more than a threshold (which can be different from the threshold used to remove key-value pairs from in-memory state in diagnostics system 202), the tool and/or process removes the entry from data repository 234.

Diagnostics system 202 additionally includes functionality to display job data 204, container data 206, and/or error data 208 from data repository 234 and/or the in-memory state in a user interface 248. For example, user interface 248 includes a graphical user interface (GUI), command line interface (CLI), web-based user interface, dashboard, and/or tool.

In some embodiments, user interface 248 includes attributes 250 of components in stream-processing system 112, as well as errors 252 that have occurred or are occurring on the components. For example, user interface 248 displays attributes 250 that include a name, instance ID, and/or attempt number associated with a job in stream-processing system 112. Below the displayed attributes 250, user interface 248 includes a list of errors 252 that have occurred or are occurring for the job, instance, and attempt number. Each error in the list includes the corresponding scope, error type, error message, error cause, affected container, timestamp, and/or other fields 246 from error data 208. In turn, an administrator and/or another user can use the displayed attributes 250 and corresponding errors 252 to view job-level error information for diagnostics purposes.

In another example, user interface 248 displays attributes 250 that include the name of a job, inputs to the job, outputs of the job, and the current health or state of the job. User interface 248 further displays lists of errors 252 grouped under different instance IDs and attempt numbers for the job. As a result, the user is able to use the displayed information to compare and/or correlate failures or errors across different instances and/or instance attempts associated with the same job.

In a third example, user interface 248 displays attributes 250 that include a job name, instance ID, attempt number, and container name for a container associated with a job. User interface 248 further displays lists of errors 252 grouped under different incarnation numbers, hosts, and container IDs associated with incarnations of the container. The user is thus able to use the displayed information to compare and/or correlate failures or errors across different container incarnations for a given job and container.

In a fourth example, user interface 248 displays attributes 250 that include a job name, instance ID, attempt number, and task name for a task under a given job. User interface 248 also displays a status or health of the task, input partitions and checkpoints associated with the task, output partitions of the task, and a list of errors 252 experienced by the task. The user can use the displayed information to analyze failures, errors, and/or performance on a per-task or per-partition basis.

Because records of activity in stream-processing system 112 are generated and received over per-job diagnostic event streams 230-232, each event stream contains a chronological sequence of events or activity for a given job. As a result, streams 230-232 allow administrators to track and/or correlate events or activity that lead up to or result in an error or failure associated with the job. Additional aggregation and/or indexing of data in streams 230-232 by keys 236-240 related to jobs, containers, errors, and/or other entities provides additional context related to the errors and allows events, activity, and/or errors to be correlated across different components of each job and/or stream-processing system 112. The tracking of earliest timestamps 254 and latest timestamps 256 in the records further reduces processing, network usage, and/or overhead by allowing each write of in-memory state to data repository 234 to be performed only for key-value pairs that have been updated since the previous write. Consequently, the disclosed embodiments provide technological improvements in applications, tools, computer systems, and/or environments for monitoring, executing, and/or managing stream-processing systems and/or diagnostics systems.

Those skilled in the art will appreciate that the system of FIG. 2 may be implemented in a variety of ways. First, diagnostics system 202, data repository 234, and user interface 248 may be provided by a single physical machine, multiple computer systems, one or more virtual machines, a grid, a cluster, one or more databases, one or more filesystems, and/or a cloud computing system. Diagnostics system 202 and user interface 248 may be implemented together and/or separately by one or more hardware and/or software components and/or layers.

Those skilled in the art will also appreciate that the system of FIG. 2 may be adapted to other types of functionality. For example, diagnostics system 202 may be configured to index records in streams 230-232 under different types of keys and/or fields. In another example, functionality related to emitting diagnostics data over event streams and/or indexing the diagnostics data under key-value pairs may be used with other types of data-processing platforms or systems.

Figure 3:
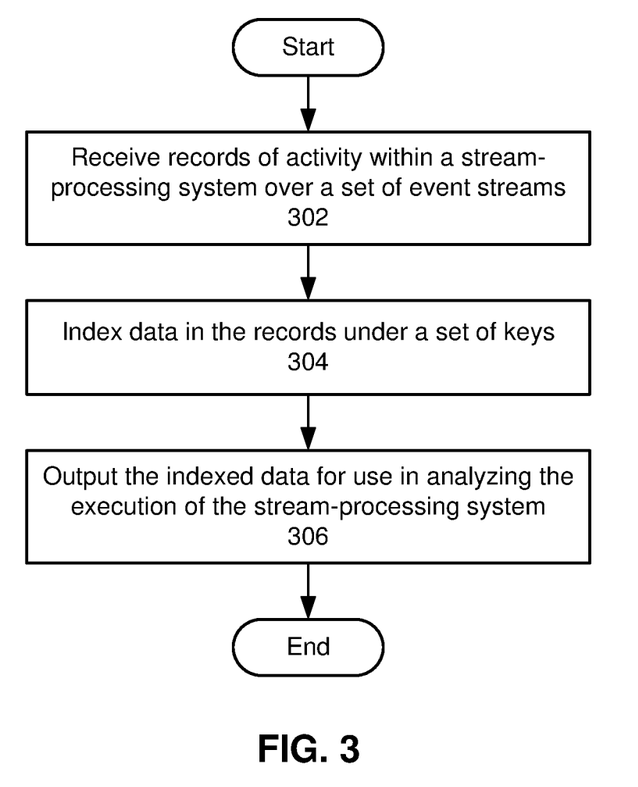
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, records of activity within a stream-processing system are received over a set of event streams (operation 302). For example, the records are received over a number of Kafka event streams, with each event stream containing events related to a corresponding job in the stream-processing system. Each record includes a job name, job ID, container name, container ID, source version, host name, timestamp, offset, and/or error.

Next, data in the records is indexed under a set of keys (operation 304), as described in further detail below with respect to FIG. 4. Finally, the indexed data is outputted for use in analyzing the execution of the stream-processing system (operation 306). For example, the data is aggregated and/or indexed under key-value pairs that are maintained in an in-memory stream-processing state and periodically written to a data store. In another example, the data is displayed in a user interface as attributes associated with the keys and errors associated with the attributes.

Figure 4:
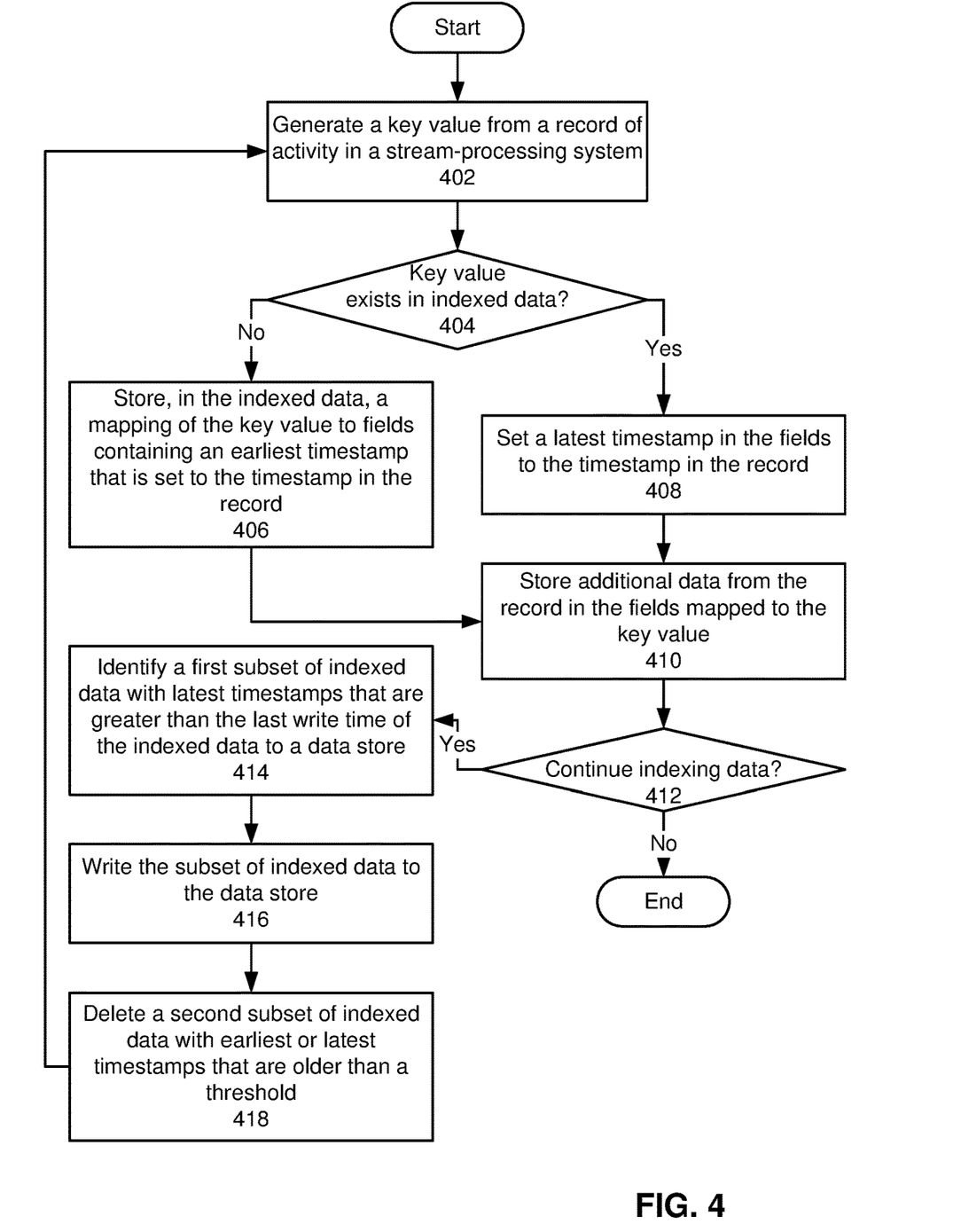
FIG. 4 shows a flowchart illustrating a process of indexing diagnostics data for a stream-processing system in accordance with the disclosed embodiments.

FIG. 4 shows a flowchart illustrating a process of indexing diagnostics data for a stream-processing system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a key value is generated from a record of activity in a stream-processing system (operation 402). For example, the key value includes a first key related to jobs in the stream-processing system, a second key related to errors in the stream-processing system, and/or a third key related to containers in the stream-processing system. The first key is generated from a job ID of a job, an instance ID of an instance of the job, and/or a number of attempts (e.g., deployments, restarts, etc.) associated with the instance. The second key is generated from a stack trace and an error type of an error. The second key is optionally also generated from attributes of the job and/or a container associated with the job. The third key is generated from a container ID of an incarnation of the container, a container name of the container, a number of incarnations of the container, and/or attributes of the job.

The key value may or may not exist in indexed data (operation 404) for the stream-processing system. As mentioned above, the indexed data includes key-value pairs that aggregate data in records of activity in the stream-processing system. The key-value pairs may be maintained in an in-memory state by stream processors that process the records of activity.

If the key value does not exist in the indexed data, a mapping of the key value to fields containing an earliest timestamp that is set to the timestamp in the record is stored in the indexed data (operation 406). If the key value does exist in the indexed data, a latest timestamp in the fields mapped to the key value is set to the timestamp in the record (operation 408). The earliest and latest timestamps thus track the range of time spanned by other fields mapped to the key value and/or records of activity that produce the key value.

Additional data from the record is also stored in the fields mapped to the key value (operation 410). For example, fields mapped to the first key store a health metric for a job, container IDs for containers associated with the job, and/or job attributes of the job. Fields mapped to the second key store timestamps representing occurrences of an error for a given job and container and/or error attributes of the error. Fields mapped to the third key store a health metric for a container and/or task attributes of tasks in the container.

Data may continue to be indexed (operation 412) using the key-value pairs. For example, indexing of data may continue while the data is collected from the stream-processing system and transmitted in records over one or more event streams for diagnostic purposes. If indexing of the data is to continue, a subset of the indexed data with latest timestamps that are greater than the last write time of the indexed data to a data store are identified (operation 414), and the subset of indexed data is written to the data store (operation 416). For example, the subset of indexed data includes one or more key-value pairs that have been updated with data in records of activity in the stream-processing system since the last write of the indexed data to a database. The identified key-value pair(s) are then written to corresponding rows in the database instead of writing all of the indexed data to the database. As a result, redundant and/or unnecessary writes of the remaining indexed data that has not been modified since the last write to the database are averted.

A second subset of indexed data with earliest or latest timestamps that are older than a threshold is also deleted (operation 418). For example, operation 418 may be performed on a periodic and/or continual basis to contain the growth of the indexed data in the in-memory state and/or data store and/or perform regular "cleanups" of old or stale data. Additional records of activity in the stream-processing system are subsequently processed to index data in the records (operation 402-412), and the indexed data is outputted, written, or deleted on a periodic, continual, and/or on-demand basis (operations 414-418) to enable diagnostics for the stream-processing system, as discussed above.

Figure 5:
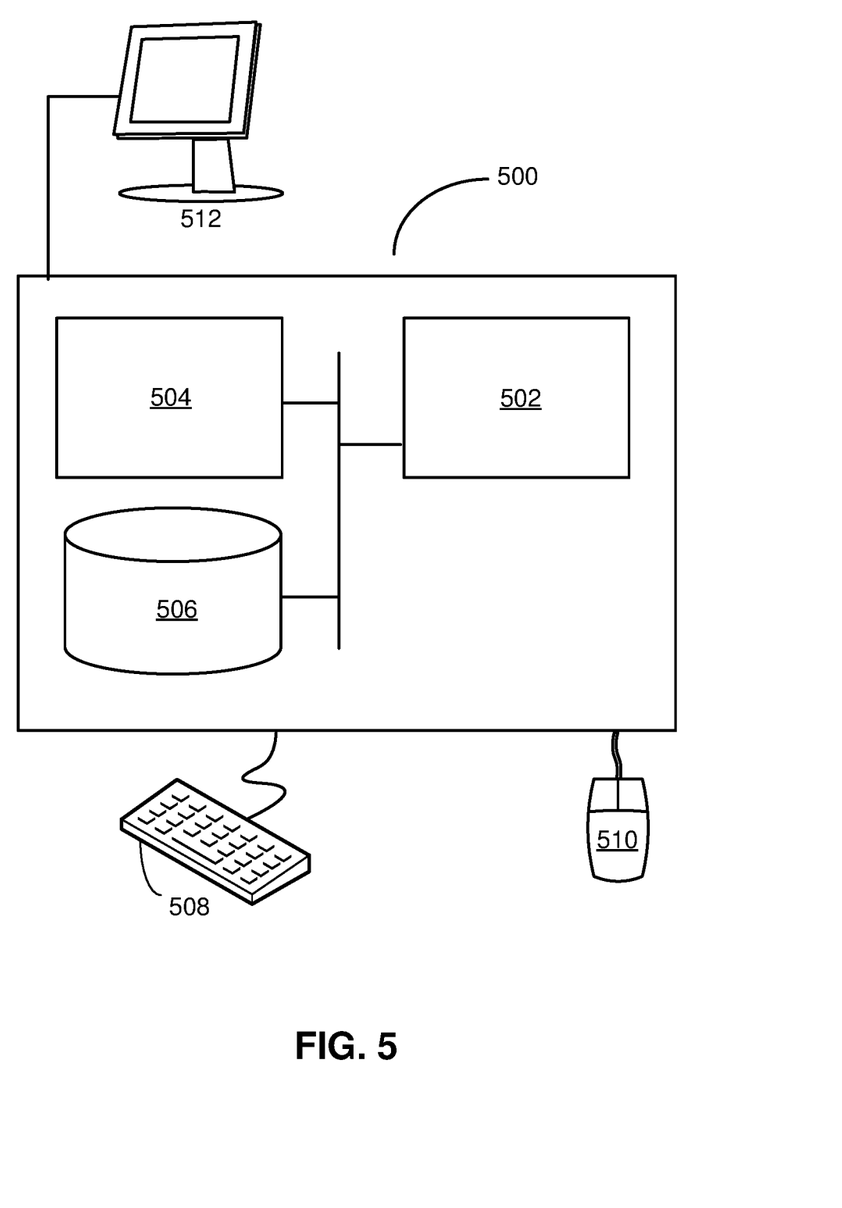
FIG. 5 show a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 includes functionality to execute various components of the present embodiments. In particular, computer system 500 includes an operating system (not shown) that coordinates the use of hardware and software resources on computer system 500, as well as one or more applications that perform specialized tasks for the user. To perform tasks for the user, applications obtain the use of hardware resources on computer system 500 from the operating system, as well as interact with the user through a hardware and/or software framework provided by the operating system.

In one or more embodiments, computer system 500 provides a system for processing data. The system includes a diagnostics system and a user interface. The diagnostics system receives records of activity within a stream-processing system over a set of event streams. Next, the diagnostics system indexes data in the records under a set of keys, which include a first key related to jobs in the stream-processing system, a second key related to errors in the stream-processing system, and/or a third key related to containers in the stream-processing system. The diagnostics system and/or user interface then output the indexed data for use in analyzing the execution of the stream-processing system.

In addition, one or more components of computer system 500 may be remotely located and connected to the other components over a network. Portions of the present embodiments (e.g., stream-processing system, diagnostics system, user interface, data repository, etc.) may also be located on different nodes of a distributed system that implements the embodiments. For example, the present embodiments may be implemented using a cloud computing system that collects, aggregates, indexes, and/or outputs diagnostics data for remote jobs, containers, instances, and/or tasks in a distributed stream-processing application.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   receiving, by one or more computer systems, records of activity within a stream-processing system over a set of event streams;
   indexing, by the one or more computer systems, data in the records under a set of keys comprising a first key related to jobs in the stream-processing system and a second key related to errors in the stream-processing system, wherein indexing the data in the records comprises:
      when a first record received over the set of event streams produces a first key value in the set of keys that is not found in the indexed data, storing, in the indexed data, a mapping of the first key value to fields that comprise an earliest timestamp that is set to a first timestamp in the first record and a latest timestamp that is also set to the first timestamp in the first record; and
      for each subsequent record received over the set of event streams that produces a second key value that is identical to the first key value, setting the latest timestamp in the fields to a second timestamp in the subsequent record; and
   outputting the indexed data.

2. The method of claim 1, wherein indexing the data in the records under the set of keys further comprises:
   generating a value of the first key based on a job identifier (ID) of a job in the stream-processing system and an instance ID of an instance of the job.

3. The method of claim 2, wherein indexing the data in the records under the set of keys further comprises:
   mapping the value of the first key to the earliest timestamp, the latest timestamp, a health metric for the job, container IDs for containers associated with the job, and job attributes of the job.

4. The method of claim 2, wherein indexing the data in the records under the set of keys further comprises:
   generating the value of the first key based on a number of attempts associated with the instance of the job.

5. The method of claim 4, wherein indexing the data in the records under the set of keys further comprises:
   generating the values of the first key based a container name for a container associated with the job, an incarnation number of the container, and a container ID for the container.

6. The method of claim 1, wherein indexing the data in the records under the set of keys further comprises:
   generating a value of the second key based on a stack trace and an error type of an error in the stream-processing system.

7. The method of claim 6, wherein indexing the data in the records under the set of keys further comprises:
   generating the value of the second key based on a job in the stream-processing system and a container associated with the job.

8. The method of claim 7, wherein indexing the data in the records under the set of keys further comprises:
   mapping the value of the second key to timestamps representing occurrences of the error for the job and the container.

9. The method of claim 6, wherein indexing the data in the records under the set of keys further comprises:
   mapping the value of the second key to the earliest timestamp, the latest timestamp, and error attributes of the error.

10. The method of claim 1, wherein indexing the data in the records under the set of keys further comprises:
generating a value of a third key in the set of keys based on a container ID of a container in the stream-processing system; and
mapping the value of the third key to the earliest timestamp, the latest timestamp, a health metric, and task attributes of tasks in the container.

11. The method of claim 1, wherein indexing the data in the records under the set of keys further comprises:
deleting a subset of the indexed data with a value of the latest timestamp that is older than a threshold.

12. The method of claim 1, wherein outputting the indexed data comprises:
identifying a subset of the indexed data with a value of the latest timestamp that is greater than a last write time of the indexed data to a data store; and writing the subset of indexed data to the data store.

13. The method of claim 1, wherein outputting the indexed data comprises:
displaying, in a user interface, an attribute associated with the set of keys and one or more errors associated with the attribute.

14. The method of claim 1, wherein each event stream in the set of event streams contains events related to a corresponding job in the stream-processing system.

15. A system comprising:
one or more processors; and
memory storing instructions that, when executed by the one or more processors, cause the system to:
receive records of activity within a stream-processing system over a set of event streams, wherein each event stream in the set of event streams contains events related to a corresponding job in the stream-processing system;
index data in the records under a set of keys comprising a first key related to jobs in the stream-processing system and a second key related to errors in the stream-processing system, wherein each value of the second key is generated based on an error type of an error and a stack trace associated with the error;
when a first record received over the set of event streams produces a first key value in the set of keys that is not found in the indexed data, store, in the indexed data, a mapping of the first key value to fields that comprise an earliest timestamp that is set to a first timestamp in the first record and a latest timestamp that is also set to the first timestamp in the first record; and
output the indexed data.

16. The system of claim 15, wherein indexing the data in the records comprises:
for each subsequent record received over the set of event streams that produces a second key value that is identical to the first key value, setting the latest timestamp in the fields to a second timestamp in the subsequent record.

17. The system of claim 15, wherein indexing the data in the records under the set of keys comprises:
generating a first value of the first key based on at least one of a job ID of a job in the stream-processing system, an instance ID of an instance of the job, and a number of attempts associated with the instance; and
generating a second value of the second key based on a stack trace and an error type of the error in the stream-processing system.

18. The system of claim 17, wherein indexing the data in the records under the set of keys further comprises:
mapping the first value of the first key to a health metric for the job, container IDs for containers associated with the job, and job attributes of the job; and
mapping the value of the second key to at least one of timestamps representing occurrences of the error and error attributes of the error.

19. The system of claim 15, wherein the records of activity comprise at least one of:
a job name;
a job identifier (ID);
a container name;
a container ID;
a source version;
a host name;
a timestamp;
an offset; or
an error.

20. A non-transitory computer-readable storage medium storing instructions that when executed by a computer cause the computer to perform a method, the method comprising:
receiving records of activity within a stream-processing system over a set of event streams;
indexing data in the records under a set of keys comprising a first key related to jobs in the stream-processing system, a second key related to errors in the stream-processing system, and a third key related to containers in the stream-processing system, wherein a container runs one or more tasks that process partitions of one or more input streams to produce output that is used to populate one or more output streams;
wherein indexing the data in the records comprises:
when a first record received over the set of event streams produces a first key value in the set of keys that is not found in the indexed data, storing, in the indexed data, a mapping of the first key value to fields that comprise an earliest timestamp that is set to a first timestamp in the first record and a latest timestamp that is also set to the first timestamp in the first record; and
for each subsequent record received over the set of event streams that produces a second key value that is identical to the first key value,
setting a latest timestamp in the fields to a second timestamp in the subsequent record;
outputting the indexed data.

* * * * *